United States Patent [19]

Kanda et al.

[11] 4,391,854
[45] Jul. 5, 1983

[54] METHOD OF MAKING A BEARING MATERIAL CONTAINING AN ALUMINUM BASE ALLOY

[75] Inventors: Yoshitsugu Kanda; Minoru Kurikawa; Toru Morimoto; Kiyoshi Nakanishi, all of Narashino, Japan

[73] Assignee: N.D.C. Co., Ltd., Chiba, Japan

[21] Appl. No.: 312,026

[22] Filed: Oct. 16, 1981

Related U.S. Application Data

[63] Continuation of Ser. No. 147,654, May 7, 1980, abandoned.

[51] Int. Cl.$^3$ ............................ B05D 3/12; B05D 3/02
[52] U.S. Cl. ..................................... 427/192; 427/201; 427/194; 427/328; 427/360; 427/366; 427/376.8; 427/405
[58] Field of Search ........................... 228/235; 29/420; 427/191, 192, 201, 194, 205, 328, 360, 366, 376.8, 405

[56] References Cited

U.S. PATENT DOCUMENTS

| | | | |
|---|---|---|---|
| 2,198,253 | 4/1940 | Koehring | 427/405 X |
| 3,310,870 | 3/1967 | Parikh et al. | 29/420.5 |
| 3,428,472 | 2/1969 | Shimose et al. | 117/22 |
| 3,745,034 | 7/1973 | Smith et al. | 427/192 |
| 4,150,179 | 4/1979 | Jones | 427/405 |

FOREIGN PATENT DOCUMENTS

| | | | |
|---|---|---|---|
| 243372 | 2/1963 | Australia | 427/192 |
| 1355958 | 1/1964 | France | 427/191 |

*Primary Examiner*—Shrive P. Beck
*Attorney, Agent, or Firm*—Sughrue, Mion, Zinn, Macpeak and Seas

[57] ABSTRACT

In the manufacture of a bearing material containing an aluminum base alloy, one surface of a steel strip is washed and roughened; the aluminum base alloy is spread on the surface of the steel strip; and the aluminum base alloy and the steel strip are hot-rolled in the air to pressure-bond the former to the latter into a unitary structure. Prior to spreading the aluminum base alloy, an aluminum powder which well adheres to the steel strip may also be spread on the surface of the steel strip.

2 Claims, 8 Drawing Figures

METHOD OF MAKING A BEARING MATERIAL CONTAINING AN ALUMINUM BASE ALLOY

This is a continuation of application Ser. No. 147,654, filed May 7, 1980, now abandoned.

BACKGROUND OF THE INVENTION

1. Field of the Invention

This invention relates to a method of making a material for bearings, and more particularly to a method of making a material suitable for bearing by pressure bonding an aluminum base alloy powder to a steel strip (including a stainless steel strip) by means of hot rolling in the air.

2. Description of the Prior Art

In recent years, an aluminum-bonded steel has come into use for the fabrication of rotary, sliding and like parts of vehicles and other machines, and a variety of methods have been proposed an employed for the manufacture of such a bearing material. However, any of these conventional manufacturing methods poses a problem in the pressure bonding of a steel strip and an aluminum powder which will ultimately form the surface layer of the resulting back steel i.e. the bearing surface; hence, there is a strong demand for a solution to this problem.

In Japanese Patent Application Publications Nos. 39213/71 and 20330/64, there is disclosed such a method as shown in FIG. 1a in which an aluminum powder 2, which will ultimately form a bearing surface (which powder will therefore be hereinafter referred to as a bearing powder), is spread by a spreader 3 over the entire surface of a steel strip 1 and then pressure-bonded thereto by heat rolling between a pair of rolls 5 in a reducing furnace 4. With this method, however, an expensive reducing furnace is needed and the pair of rolls 5 must be placed in the furnace 4, so that there are serious problems in equipment and in dimensional control during rolling.

In Japanese Patent Disclosure No. 20336/77 there is set forth such a method as shown in FIG. 1b in which the bearing powder 2 is spread all over the steel strip 1 together with a binding powder such as aluminum, an aluminum base alloy or the like and the powders are pressure-bonded to the steel strip 1 by cold rolling between the pair of rolls 5 and then the resulting sheet is annealed in a heating furnace 4. With this method, however, the powders are pressure-bonded at room temperature, so that in order to achieve the pressure bonding to a certain degree (i.e. to roll the bearing powder nearly to its forging density), it is necessary to apply such a large rolling force as to reduce the thickness of the steel strip about 15%; this induces a large strain in the steel strip and is likely to introduce difficulty in the subsequent working. Further, this method cannot be used with a powder which is difficult to be sintered, such as an Al—Si—Cu—Pb—Sn alloy powder. After the pressure bonding, the aluminum-bonded steel strip is continuously annealed in the heating furnace 4 and then taken up on a reel; if this annealing is insufficient, the bearing surface layer is liable to crack.

In Japanese Patent Disclosure No. 83651/74 there is disclosed such a method as depicted in FIG. 1c in which the bearing powder 2 is spread over the entire surface of the steel strip 1 and heated in a furnace 4 containing an inert atmosphere, thereafter being rolled between the pair of rolls 5 for pressure bonding to the steel strip 1. This method involves the step of heating in the inert atmosphere, and hence requires expensive equipment as is the case with any of the aforesaid methods; furthermore, a large amount of inert gas is needed inevitably resulting in the manufacturing cost being raised.

Moreover, U.S. Pat. Nos. 3,104,135 and 3,093,885 propose such a cladding method as shown in FIG. 1d in which a bearing steel sheet 6, prefabricated by a complicated manufacturing process, is clad on a steel strip by the pair of rolls 5. This method requires expensive apparatus such as a continuous forcing machine, a powder roll machine and so forth.

SUMMARY OF THE INVENTION

In view of the shortcomings of the prior art described above, it is an object of this invention to provide a method of making an aluminum-bonded steel material which does not involve such expensive apparatus as an atmosphere furnace a cladding machine and so forth but ensures excellent unification of a bearing surface layer and a steel strip used as a back metal.

In accordance with one aspect of the present invention, the surface of a steel strip fed continuously is cleaned and roughened, and a bearing powder of aluminum is spread all over the surface of the steel strip and then pressure-bonded thereto by hot rolling in the air.

In accordance with another aspect of the present invention, the surface of a steel strip fed continuously is washed and roughened, and an aluminum powder consisting essentially of aluminum or aluminum powder exhibiting a high degree of adherence to the steel strip, such as, for example, an Al—Si powder is first spread on the surface of the steel strip and then bearing powder of aluminum is scattered, and thereafter the powders are pressure-bonded to the steel strip by hot rolling.

DESCRIPTION OF THE PREFERRED EMBODIMENTS

Figure 1A:
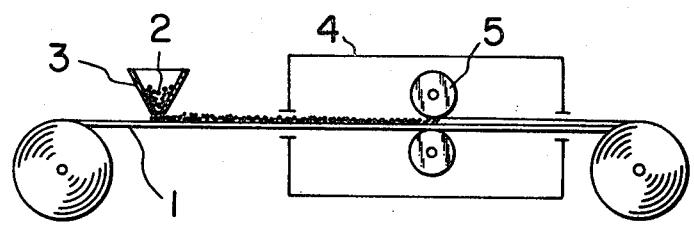
FIGS. 1a to 1d are schematic diagrams respectively showing conventional bearing material manufacturing methods.
Figure 1B:
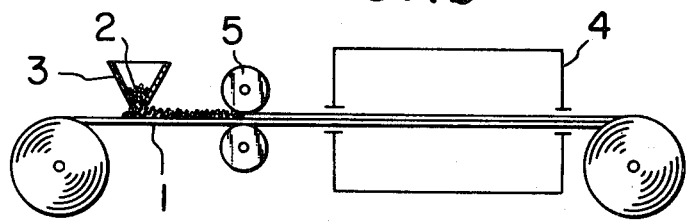
Figure 1C:
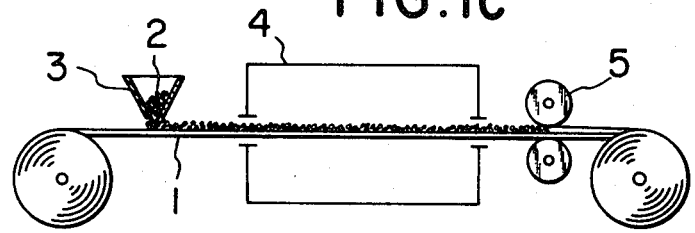
Figure 1D:
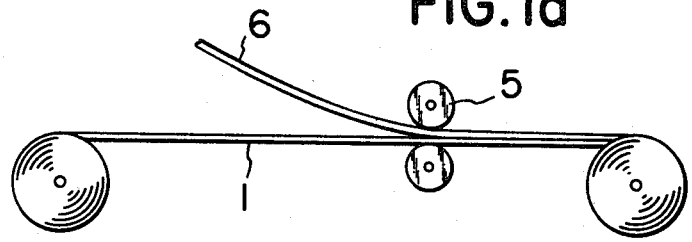
Figure 2:
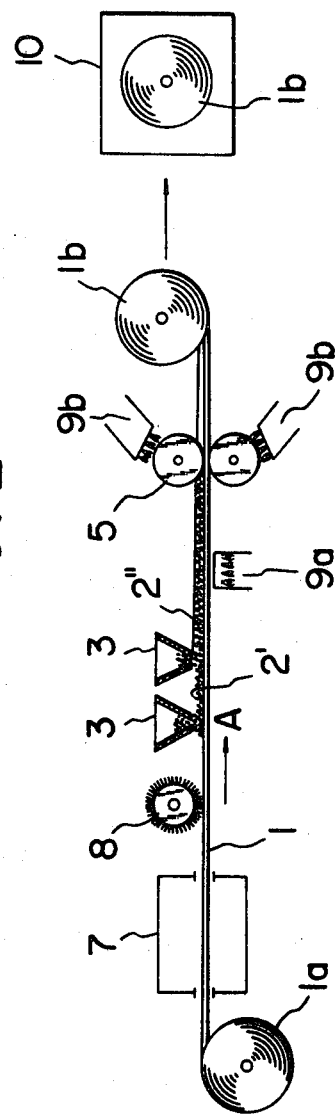
FIG. 2 is a schematic diagram illustrating, by way of example, the manufacturing method of this invention.

In FIG. 2 there is shown an arrangement of apparatus for use with this invention. Reference numeral 1 indicates a steel strip, which is unwound from a coil 1a and continuously fed in the direction of the arrow A. The steel strip 1 is fed first to a washing machine, wherein one surface of the steel strip 1 is washed, and then the surface of the steel strip 1 is ground by a grinder 8 to a required roughness. The treatments of washing and grinding by the washing machine 7 and the grinder 8 are intended to remove from the surface of the steel strip 1 oil and fats and iron oxides which prevent firm adherence of the aluminum powders to the steel strip, thereby to maintain or improve the adherence of the former to the latter. The surface roughness in this case is sufficient to be about 25S. The steel strip 1 may be one that is usually employed as a back metal; in the present invention, a low-carbon steel containing about 0.1% of carbon is usually employed, but use can also be made of an austenite or ferrite stainless steel.

After washing and grinding the surface of the steel strip 1 as described above, a bearing powder 2" of aluminum is spread by a spreader 3 over the entire surface of the steel strip 1. The bearing powder of aluminum herein mentioned is an aluminum base alloy consisting of aluminum and some other elements which impart to the aluminum required properties of the bearing surface which will ultimately be formed. In this case, the bearing powder of aluminum forms the bearing surface layer on the steel strip, as will be described later.

In the above, it is also possible to spread by another spreader 3 an aluminum powder 2', which consists essentially of aluminum, prior to the spreading of the abovesaid bearing powder 2". The aluminum powder 2' is to facilitate the formation of a close contact layer of the steel and the bearing powder. The aluminum powder 2' may also be added with any other components so long as the abovesaid close contact layer can be formed.

Following the spreading of the aluminum powder 2' and the bearing powder 2", the steel strip 1 is heated by a heater 9a up to a temperature in the range of, 200° to 400° C., and then the powders 2' and 2" are pressure-bonded by hot rolling to the steel strip 1 between a pair of rolls 5 which are heated by heaters 9b in the air up to a temperature in the range of 150° to 400° C. The above pressure bonding takes place in the air, but the aluminum powder 2' and the bearing powder 2" of the aluminum base alloy are pulverized on the steel strip 1 to achieve metallic coupling therewith, thus obtaining a bearing surface layer which firmly adheres to the steel strip 1.

The powders are heated up to such a high temperature, and when they are hot-rolled, their particles rub against one another to generate heat, by which they are heated up to an appreciably high temperature in a moment. In this case, the particles are given ductility due to heat by the hot rolling, and in spite of heating in the air, air present in the gaps between the particles is instantly driven out and an oxide film ($Al_2O_3$) on the surface of each particle is readily destroyed by the rolling force by which the powders are forged; consequently, active coupling of the particles can be obtained without causing their oxidation to proceed. On top of that, only by the operation of hot rolling, the powders are sufficiently diffused into each other and their firm adherence to the steel strip can be achieved.

For the above pressure bonding, it is sufficient to perform hot rolling at such a temperature that the steel strip reaches its forging density at a reduction ratio of about 3 to about 25%. With such a rolling force being applied, sufficient adherence and sintering can be achieved only by hot rolling. Even if the adherence of the powders to the steel strip is yet insufficient, heat treatment which usually takes place after hot rolling permits sufficient diffusion of the aluminum base alloy powder into the steel strip to achieve firm coupling therebetween and, at the same time, increases the ductility of the bearing surface layer. Further, the heating means 9a and 9b for the hot rolling may be gas, high frequency induction or like heaters; the heater 9a need not always be provided, but the combined used of the heaters 9a and 9b produces an appreciable effect on the pressure bonding of the aluminum base alloy bearing powder.

In the manner described above, the aluminum base alloy bearing powder is pressure-bonded to the steel strip to form thereon a bearing surface layer, and the resulting bearing steel strip is taken up into a coil 1b.

The bearing steel strip can be used to make bearings but may also be further heated in an air atmosphere, for example, in a heating furnace 10 at 250° to 500° C. Such heating in the air promotes diffusion of the aluminum base alloy into the steel strip to ensure firm adherence of the bearing surface layer to the steel strip, providing an excellent structure as a bearing metal.

As revealed by the foregoing description, the present invention has such advantages as follows:

The present invention:

(1) Performs heating and pressure bonding in the air and does not require an expensive atmosphere furnace, and hence permits reduction of the manufacturing cost and simplification of the manufacturing process;

(2) Does not involve a process of pressure-bonding a prefabricated bearing material sheet to the steel strip, and hence does not require any complicated manufacturing equipment; and (3) Does not require a large reduction ratio of the steel strip in the rolling process, so that the resulting bearing steel is small in work hardening and excellent in workability.

The present invention will be further described in connection with its preferred embodiments.

EXAMPLE 1

Use was made of the manufacturing equipment of FIG. 2, in which a steel strip 1 was continuously fed and its surface was washed as usual and ground to a surface roughness of about 25S. Then, the aluminum powder 2' was spread by the spreader 3 all over the roughened surface of the steel strip 1 and then the aluminum base alloy bearing powder was also spread by the spreader 3. The aluminum base alloy bearing powder used was an Al—Si—Cu—Pb—Sn alloy powder (Si 4%, Cu 1%, Pb 8.5% and Sn 1.5%). Then, the steel strip covered with the powders was heated by the heater 9a up to about 350° C. in the air and rolled, at a reduction ratio of 10%, by the pair of rolls 5 heated up to 250° C. to pressure-bond the powders to the steel strip, thereafter being taken up into the coil 1b.

Figure 3:
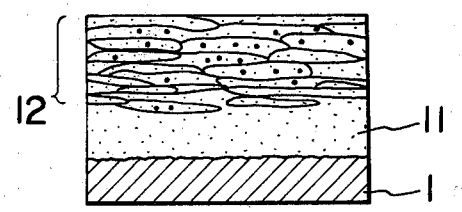
FIGS. 3 to 5 are sketches of microstructures of some bearing materials produced by the present invention.

The sectional structure of the thus obtained bearing material examined by microphotography was such a three-layered structure as shown in FIG. 3. The bearing surface layer of the bearing material firmly adhered to the steel strip and the bearing material obtained by this Example did not pose any problems in the bearing performance.

The bearing material shown in FIG. 3 is composed of the steel strip 1, a binding layer 11 and an alloy layer 12.

EXAMPLE 2

In the manufacturing equipment shown in FIG. 2, after one surface of a steel strip 1 was washed and roughened as in Example 1, an aluminum powder was spread on the roughened surface of the steel strip 1 and then an aluminum base alloy bearing powder was spread, thereafter being pressure-bonded by hot rolling to the steel strip 1 between the pair of rolls 5 heated up to 350° C., with the reduction ratio of the steel strip being held at 12%. Thereafter, the resulting bearing material was taken up into the coil 1b and then sintered in the heating furnace 10 at 400° C. for three hours. The sectional structure of this bearing material was substantially the same as shown in FIG. 3.

EXAMPLE 3

Figure 4:
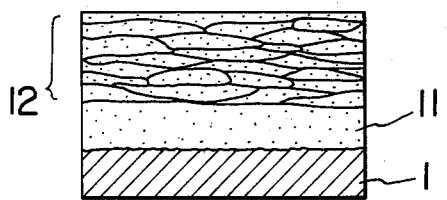

In the manufacturing equipment of FIG. 2, as in Example 1, after one surface of a steel strip was washed and roughened, an aluminum powder was spread on the roughened surface of the steel strip 1 and then an Al—Si—Cu alloy powder (Si 3.3% and Cu 0.6%) was spread, thereafter being heated by the heater 9a in the air up to 300° C. and pressure-bonded by hot rolling to the steel strip 1 between the pair of rolls 5 heated up to 250° C., with the reduction ratio of the steel strip 1 being held at 8%. The sectional structure of this bearing material was such as shown in FIG. 4, and its bearing surface layer firmly adhered to the steel strip 1.

EXAMPLE 4

In the manufacturing equipment of FIG. 2, after washing and roughening one surface of a steel strip 1 as in Example 1, an aluminum powder was spread as in Example 3 and an aluminum base alloy powder was spread, thereafter being pressure-bonded by hot rolling to the steel strip 1 between the pair of rolls 5 heated up to 400° C., with the reduction ratio of the steel strip 1 being held at 5%. After taken up into the coil 1b, the bearing material was heated in the heating furnace 10 at 400° C. for three hours. The sectional structure of this bearing material was such as shown in FIG. 4, and its bearing surface layer firmly adhered to the steel strip 1.

EXAMPLE 5

Figure 5:
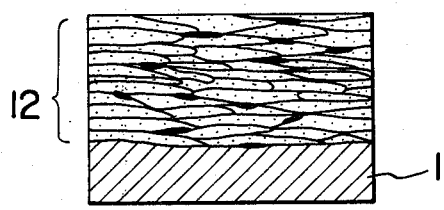

In the manufacturing equipment of FIG. 2, after washing and roughening one surface of a steel strip 1 as in Example 1, an aluminum base alloy bearing powder consisting of 90 wt% of Al—Si alloy (Si 4%) and 10 wt% of Pb—Sn alloy (Sn 8%) was spread over the entire area of the roughened surface of the steel strip and then heated by the heater 9a, thereafter being pressure-bonded to the steel strip 1 by the pair of rolls 5 heated up to 350° C., with the reduction ratio of the steel strip 1 being held at 10%. The sectional structure of this bearing material was such as shown in FIG. 5, and its bearing surface layer firmly adhered to the steel strip.

EXAMPLE 6

In the manufacturing equipment, after one surface of a stainless steel strip 1 was washed and roughed as in Example 1, the aluminum powder 2' and the aluminum base alloy bearing powder 2'' were spread on the surface of the stainless steel strip 1. In this case, the aluminum base alloy powder was the Al—Si—Cu—Pb—Sn alloy powder used in Example 1. Then, the stainless steel strip 1 and the powders spread thereon were heated by the heater 9a up to about 350° C. in the air and then hot-rolled by the pair of rolls 5 heated up to about 200° C., with the reduction ratio of the stainless steel strip 1 being held at 7%. Thereafter, the resulting bearing material was taken up into the coil 1b and heated in the heating furnace 10 at 400° C. for three hours.

The sectional structure of this bearing material, examined by microphotography, was such as shown in FIG. 3, as in Example 1, and the bearing performance of this material was satisfactory.

EXAMPLE 7

In the manufacturing equipment shown in FIG. 2, after one surface of a stainless steel strip 1 was washed and roughened as in Example 1, an aluminum base alloy bearing powder 2'' (Si 4%, Cu 1%, Pb 8.5% and Sn 1.5%) was spread all over the roughened surface of the stainless steel strip 1 and heated by the heater 9a in the air up to 350° C., thereafter being pressure-bonded to the stainless steel strip 1 between the pair of rolls 5 heated up to 250° C., with the reduction ratio of the stainless steel strip being held at 10%. Then, the resulting bearing material was taken up into the coil 1b and sintered in the heating furnace at 400° C. for three hours. In the sectional structure of this bearing material, the bearing surface layer firmly adhered directly to the stainless steel strip 1.

EXAMPLE 8

In the manufacturing equipment shown in FIG. 2, after one surface of a steel strip 1 was washed and roughened as in Example 1, an aluminum base alloy bearing powder 2'' (Si 4%, Cu 1%, Pb 8.5% and Sn 1.5%) was spread all over the roughened surface of the steel strip 1 and heated by the heater 9a in the air up to 350° C., thereafter being pressure-bonded to the steel strip 1 between the pair of rolls 5 heated up to 250° C., with the reduction ratio of the steel strip being held at 10%. Then, the resulting bearing material was taken up into the coil 1b and sintered in the heating furnace at 400° C. for three hours. In the sectional structure of this bearing material, its bearing surface layer firmly adhered directly to the steel strip 1.

EXAMPLE 9

In the manufacturing equipment of FIG. 2, after washing and roughening one surface of a steel strip 1 as in Example 1, an aluminum base alloy bearing powder consisting of 90 wt% of Al—Si—Cu alloy (Si 3.3% and Cu 0.6%) and 10 wt% of Pb—Sn alloy (Sn 8%) was spread all over the roughened surface of the steel strip 1 and then heated by the heater 9a up to 350° C. in the air, thereafter being pressure-bonded to the steel strip 1 between the pair of rolls 5 heated up to 300° C., with the reduction ratio of the steel strip 1 being held at 10%. This bearing material also had such a sectional structure as shown in FIG. 5 in which its bearing surface layer firmly adhered to the steel strip.

EXAMPLE 10

In the manufacturing equipment of FIG. 2, after washing and roughening of one surface of a stainless steel strip 1 as in Example 1, an aluminum base alloy bearing powder consisting of 80 wt% of Al—Si—Cu—Pb—Sn alloy (Si 4%, Cu 1%, Pb 8.5% and Sn 1.5%) and 20 wt% of Al—Si—Cu alloy (Si 3.3% and Cu 0.6%) was spread directly all over the roughened surface of the stainless steel strip 1 and then pressure-bonded to the stainless steel strip 1 between the pair of rolls heated up to 350° C., with the reduction ratio of the stainless steel strip being held at 12%. Thereafter, the bearing material was taken up into the coil 1b and sintered in the heating furnace 10 at 400° C. for three hours. The bearing material thus obtained also had such a sectional structure as shown in FIG. 4, in which its bearing surface layer firmly adhered to the stainless steel strip 1.

As has been described in the foregoing, according to the present invention, an aluminum base alloy bearing powder is spread on a steel strip and pressure-bonded thereto by hot rolling to obtain a material for bearings. Unlike in the prior art, neither an atmosphere furnace nor a heating furnace is needed, and the entire manufacture process takes place in the air atmosphere, so that it is possible to enhance the quality of the material and reduce its manufacturing cost, permitting the fabrication of an excellent aluminum base alloy bearing material.

It will be apparent that many modifications and variations may be effected without departing from the scope of the novel concepts of this invention.

What is claimed is:

1. A method of making an aluminum base alloy bearing material, comprising the steps of:
   (a) washing one surface of a continuously fed steel strip or stainless steel strip;
   (b) grinding the resulting washed surface of the strip;
   (c) spreading on the resulting ground surface of the strip an aluminum base alloy powder containing from 6.8 to 9.2 wt % lead and from 0.8 to 1.5 wt % tin, to form an aluminum base alloy powder on the surface of the strip;
   (d) preheating the strip having the aluminum base alloy powder thereon by the application of heat to the other surface of the strip to a temperature in the range of from 200° C. to 400° C., in an air atmosphere, without directly heating the aluminum base alloy;
   (e) hot-rolling the preheated strip and the aluminum base alloy in the air atmosphere between a pair of heated rolls, each heated up to from 150° C. to 400° C. over the entire area of the surface thereof, to thereby pressure-bond the aluminum base alloy powder to the strip to form thereon a bearing surface layer;
   (f) taking up the resulting bearing steel strip into a coil; and
   (g) heating the coil in a furnace to sinter the coating at a temperature of from 250° C. to 500° C.

2. A method of making an aluminum base alloy bearing material, comprising the steps of:
   washing and roughening one surface of a continuously fed steel strip;
   spreading on the surface of the steel strip an aluminum powder consisting essentially of aluminum;
   spreading an aluminum base alloy powder on the aluminum powder; and
   hot-rolling the aluminum powder, the aluminum base alloy powder and the steel strip to pressure-bond the powders to the steel strip into a unitary structure.

* * * * *